(12) United States Patent
Cook

(10) Patent No.: US 6,986,209 B2
(45) Date of Patent: Jan. 17, 2006

(54) LASER SIGHTING DEVICE AND METHOD

(76) Inventor: Todd Cook, 18 Great Hill Rd., Gloucester, MA (US) 01930

( * ) Notice: Subject to any disclaimer, the term of this patent is extended or adjusted under 35 U.S.C. 154(b) by 0 days.

(21) Appl. No.: 10/942,520

(22) Filed: Sep. 16, 2004

(65) Prior Publication Data
US 2005/0060901 A1 Mar. 24, 2005

Related U.S. Application Data

(60) Provisional application No. 60/504,397, filed on Sep. 19, 2003.

(51) Int. Cl.
G01C 15/00 (2006.01)
(52) U.S. Cl. .................. 33/286; 33/DIG. 21
(58) Field of Classification Search .......... 33/227, 33/290, 285–286, 613, 644, 283, 520, 670–671
See application file for complete search history.

(56) References Cited

U.S. PATENT DOCUMENTS

| | | | | |
|---|---|---|---|---|
| 2,484,801 A | * | 10/1949 | Anderson | 33/644 |
| 3,874,088 A | * | 4/1975 | Shaffer, Jr. | 33/286 |
| 3,897,637 A | * | 8/1975 | Genho | 33/227 |
| 4,206,550 A | | 6/1980 | Boyett et al. | 33/286 |
| 4,681,439 A | | 7/1987 | Shoemaker | 356/154 |
| 4,754,551 A | * | 7/1988 | Scott | 33/520 |
| 4,773,164 A | * | 9/1988 | Taylor et al. | 33/520 |
| 5,168,638 A | * | 12/1992 | Barton | 33/644 |
| 5,481,809 A | * | 1/1996 | Rooney | 33/392 |
| 5,568,265 A | | 10/1996 | Matthews | 356/399 |
| 5,784,792 A | | 7/1998 | Smith | 33/227 |
| 5,836,081 A | * | 11/1998 | Orosz, Jr. | 33/290 |
| 6,012,229 A | * | 1/2000 | Shiao | 33/365 |
| 6,028,665 A | * | 2/2000 | McQueen | 33/286 |
| 6,101,728 A | * | 8/2000 | Keng | 33/283 |
| 6,124,935 A | | 9/2000 | Matthews | |
| 6,178,649 B1 | * | 1/2001 | Wu | 33/286 |
| 6,371,626 B1 | * | 4/2002 | Addona | 33/DIG. 21 |
| 6,427,347 B1 | | 8/2002 | Butler, Sr. | 33/286 |
| 6,430,823 B1 | * | 8/2002 | Seki | 33/281 |
| 6,438,854 B1 | | 8/2002 | Kott, Jr. | 33/286 |
| 6,532,676 B2 | | 3/2003 | Cunningham | 33/286 |
| 6,598,304 B2 | * | 7/2003 | Akers | 33/286 |

(Continued)

FOREIGN PATENT DOCUMENTS

EP    1065483    1/2001

OTHER PUBLICATIONS

PCT International Search Report and Written Opinion for PCT/US04/30369 filed Sep. 16, 2004.

Primary Examiner—Diego Gutierrez
Assistant Examiner—Yaritza Guadalupe
(74) Attorney, Agent, or Firm—Choate, Hall & Stewart LLP

(57) ABSTRACT

A method and device for allowing accurate sequential hole drilling locations in multiple floor and ceiling joists that includes a means for marking multiple holes without the need to measure, level and mark each individual joist or to run plumb lines. In one embodiment, the laser sighting device of the present invention includes a main body housing, a centering cone, an extension tube, and an adjustable center or bracket. A laser unit is positioned within the device and emits a laser from one end of the centering cone. A level allows accurate adjustment of pitch and yaw angles for a positioned orientation of the laser sighting device.

20 Claims, 7 Drawing Sheets

U.S. PATENT DOCUMENTS

| | | | |
|---|---|---|---|
| 6,802,817 B2 * | 10/2004 | Baxter-Jones et al. | 33/512 |
| 2001/0034944 A1 * | 11/2001 | Cunningham | 33/286 |
| 2002/0062570 A1 * | 5/2002 | Palumbo et al | 33/286 |
| 2002/0108261 A1 * | 8/2002 | Miller | 33/283 |
| 2004/0064959 A1 | 4/2004 | Kallabis | |
| 2004/0111902 A1 * | 6/2004 | Fletcher | 33/286 |
| 2004/0123473 A1 * | 7/2004 | Malard et al. | 33/286 |
| 2005/0022400 A1 * | 2/2005 | Ritenour | 33/292 |

* cited by examiner

LASER SIGHTING DEVICE AND METHOD

CROSS-REFERENCE TO RELATED APPLICATIONS

The present application claims the benefit of U.S. Provisional Application No. 60/504,397, filed Sep. 19, 2003, which is incorporated herein by reference.

FIELD OF THE INVENTION

The present invention is directed to the field of alignment and sighting and more particularly to a device and method for accurately projecting a path for the drilling of multiple in-line holes and for alignment purposes.

BACKGROUND OF THE INVENTION

Lasers are known in the prior art as providing a means for leveling and alignment in construction and installation applications. The use of a highly focused laser allows a precise determination and measurement of ground grades, slopes and other tilting structures. Examples in the prior art are described below, of which all are incorporated herein by reference.

U.S. Pat. No. 5,784,792 to Smith, issued Jul. 28, 1998, entitled "Hand-held Laser Level Grade Checking Device" discloses a tool for use in checking the level or grade of the ground surface in a construction site using a daylight visible wavelength semiconductor.

U.S. Pat. No. 5,568,265 to Matthews, issued Oct. 22, 1996, entitled "Pipe Fitting Alignment Systems" discloses a portable hand tool having the appearances of a flashlight and the capability of projecting a collimated, coherent, highly focused light beam for use as an alignment system.

U.S. Pat. No. 4,681,439 to Shoemaker, issued Jul. 21, 1987, entitled "Piper Laying Method and Apparatus" discloses a method and apparatus employed to give the operator or excavating equipment a quick and accurate visual indication of the amount of excavation required to attain a desired grade level.

U.S. Pat. No. 4,206,550 to Boyett et al., issued Jun. 10, 1980, entitled "Point-to-point Self-plumbing Apparatus and Method" discloses a plumbing device including a source of light in a gimbal system for providing two oppositely directed aligned vertically oriented beams of light.

European Patent Publication No. EP 1,065,483 to Hollander, published Jan. 3, 2001, entitled "Laser Sighting Beam Modification for Measuring or Treatment Instrument" discloses a laser beam device for aiming at a target by instruments for measuring, controlling and treatment.

Accordingly, there is a need for an easily and efficiently operable laser hole finder for alignment applications and to provide accurate sequential hole drilling locations through multiple support structures, especially in the plumbing and electrical trade industries.

SUMMARY OF THE INVENTION

A method and device allowing identification of accurate sequential hole drilling locations in multiple floor and ceiling joists for such applications as plumbing work, electrical work and other installation and construction trades. The present invention provides a laser sighting device including a means for marking multiple holes without the need to measure, level and mark each individual joist or to run plumb lines. In one embodiment, the invention includes a main body housing, a centering member, an extension tube, and an adjustable center or bracket. A laser unit is positioned within the device and emits a laser from one end of the centering member. A level allows accurate adjustment of pitch and yaw angles for a positioned orientation of the laser sighting device.

BRIEF DESCRIPTION OF THE DRAWINGS

The invention is described with reference to the several figures of the drawings, in which.

DETAILED DESCRIPTION OF VARIOUS EMBODIMENTS

Figure 1A:
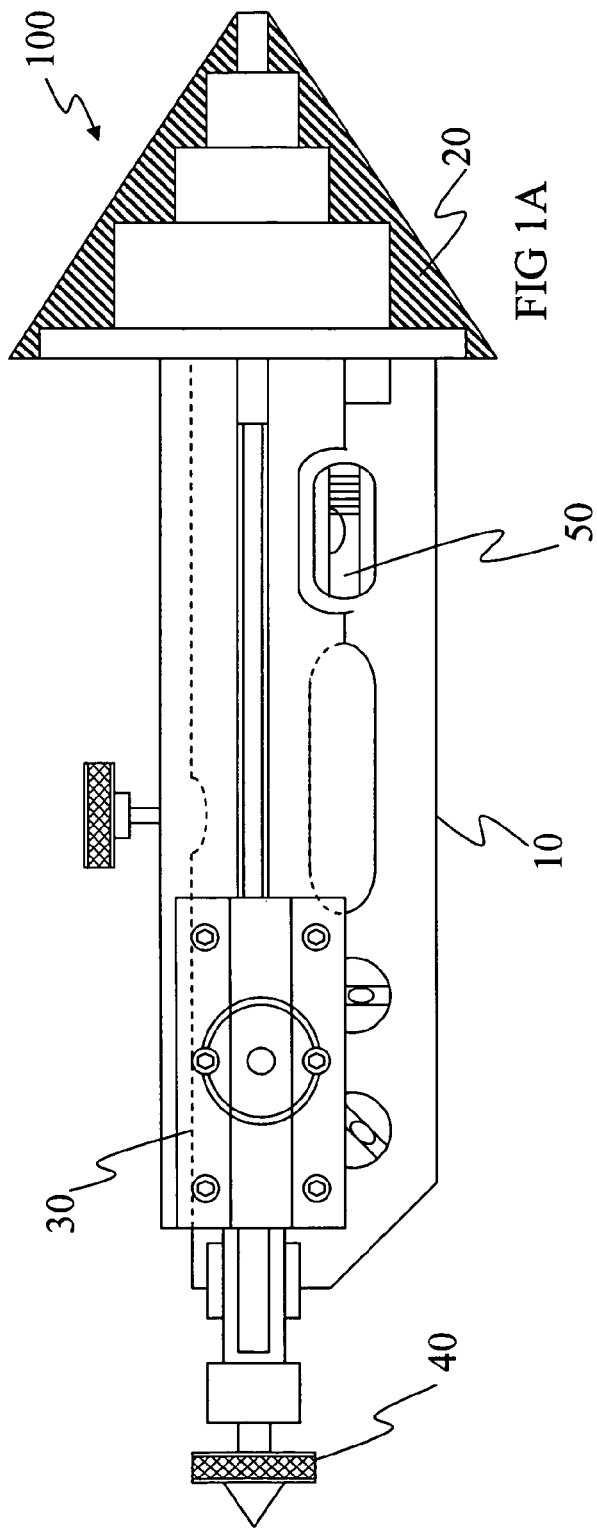
FIGS. 1A and 1B show a side view and end view, respectively, of a laser sighting device according to one embodiment of the invention.

A laser sighting device and method according to the present invention provides a quick and accurate way to locate center marks for drilling multiple holes. The need to measure, level and mark individual joists is eliminated. The laser sighting device is a labor saving device that eliminates the need for line levels, traditional torpedo levels, bubble levels, plumb lines, caulk lines, sight wires or strings for alignment, level sticks, ceiling brackets and allows one tradesman, instead of multiple workers, to pinpoint drilling locations and accurately align components and structures to exacting tolerances.

Referring now to the figures of the drawing, the figures constitute a part of this specification and illustrate exemplary embodiments of the invention. It is to be understood that in some instances various aspects of the invention may be shown exaggerated or enlarged to facilitate an understanding of the invention.

Figure 1B:
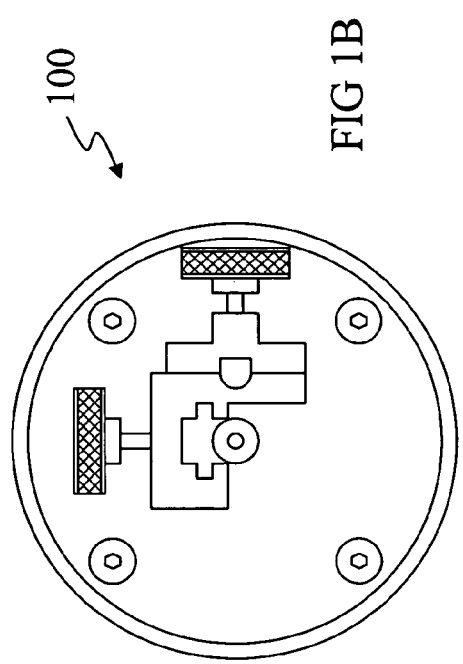

FIGS. 1A and 1B show a side view and end view, respectively, of a laser sighting device 100 according to one embodiment of the present invention. The laser sighting device 100 includes a main body housing 10 with a conical end or other centering member attachment 20 that allows the laser to be precisely centered in a starter hole drilled in an initial joist or other structure. A level 50 is attached to the housing for easy pitch determination. An extension tube 20 and securing mechanism 40 is provided for securing the device between joists or to other structures.

Figure 2:
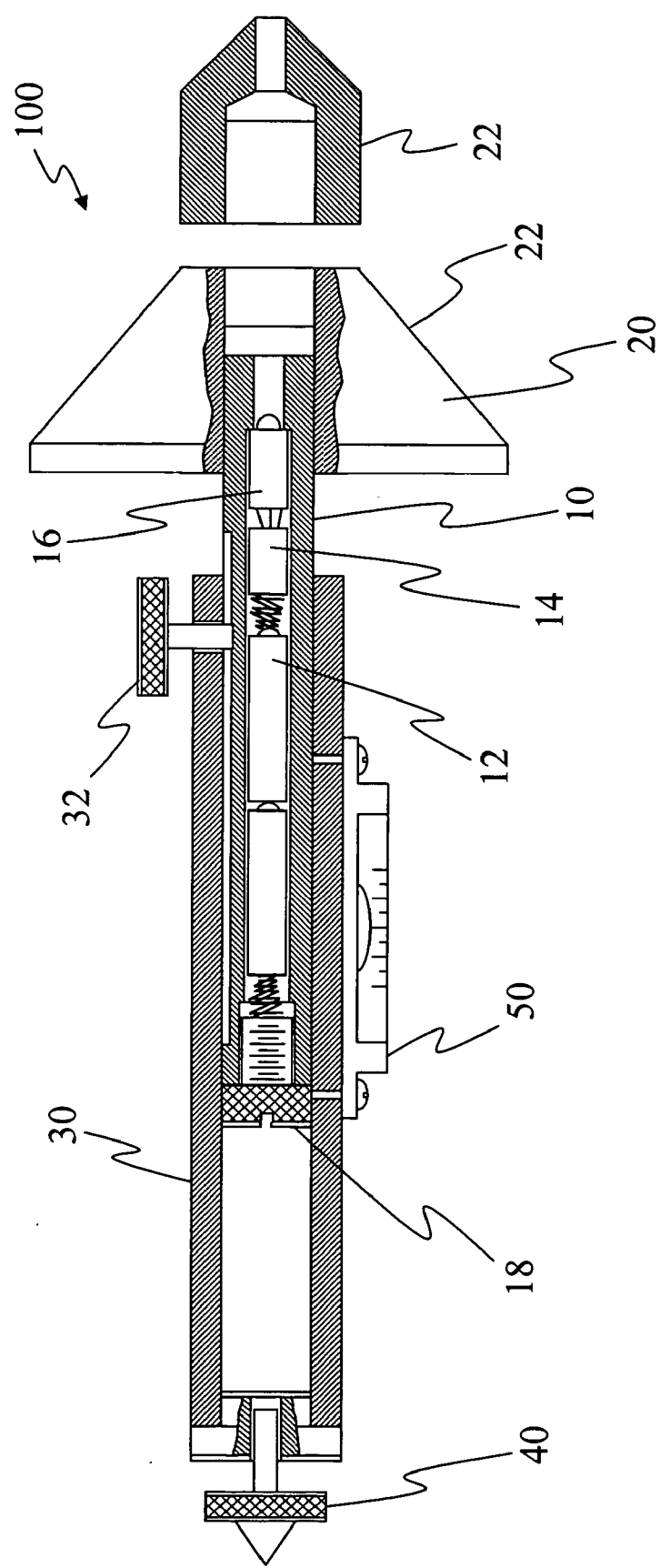
FIG. 2 is a cross-sectional view showing the internal configuration of the laser sighting device according to one embodiment of the invention.

FIG. 2 is a cross-sectional view showing the internal configuration of the laser sighting device 100 according to one embodiment of the invention. The laser sighting device's 100 external structure includes main body housing 10, centering member 20, extension tube 30, and securing mechanism 40, such as an adjustable center. A spirit or graduated level 50 is attached to the main body 10 or extension tube 30. In the embodiment shown, a power source 12 (i.e. batteries), a PC board or other control electronics 14, and a laser unit 16 are positioned within the main body housing 10 and held in position by a screw cap 18. As shown, the centering member 20 may have conical shape and include removable and interchangeable heads 22 that are installed depending on the required application. The cone shape of the centering member 20 and interchangeable heads 22 allows the laser sighting device to be self-centering in a starter hole having a variety of sizes and shapes, including round, square or any equilateral-sided shape. However, other design shapes of the centering member to mount the laser sighting device for its intended use are possible and contemplated herein. Accordingly, the laser sighting device has a flexible design that is operable with a wide variety of starter hole sizes and shapes.

Figure 3:
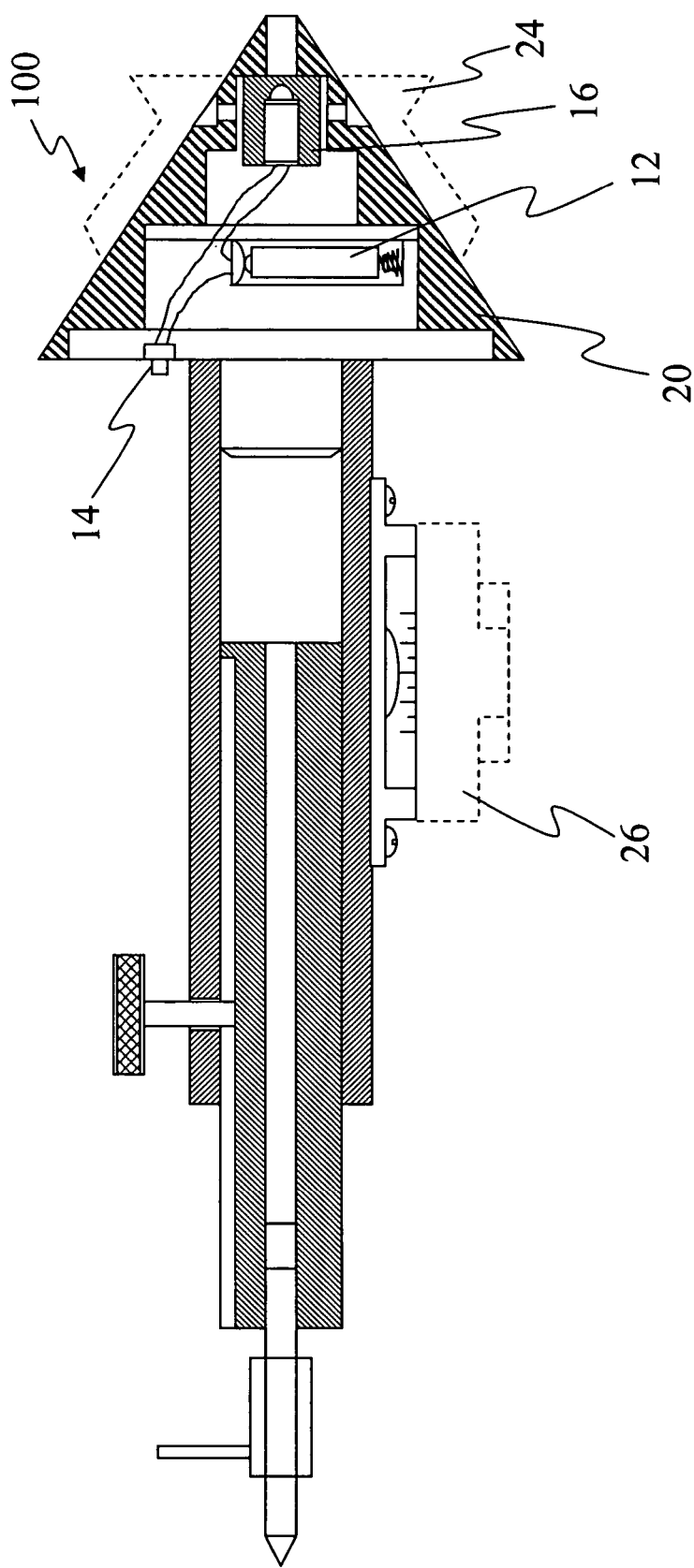
FIG. 3 is a cross-sectional view showing an alternate internal configuration of the laser sighting device according to one embodiment of the invention.

In alternative embodiments, the centering member 20 or interchangeable heads 22 may include a chuck mechanism (e.g. two or three-jawed chucks) utilized to adjustably position the centering member in an opening. It is also contemplated that the laser sighting device can be positioned irregularly or off-center in an opening, depending on the situation in which the laser sighting is needed. Further, with the use of a flange or collet, the laser sighting device may be positioned in any single opening on a beam, flange or other type of web, slab or plate and, with a leveling device, may be positioned at any desired orientation on a horizontal surface, a vertical surface or a sloped surface. FIG. 3 illustrates one embodiment of a position securing mechanism 24 (shown by a dashed line) such as a chuck, flange or collet attached to the centering member 20 of the laser sighting device 100. Further, it is contemplated that the position securing mechanism 24 could be attached at other locations on the laser sighting device 100 suitable for securing the laser sighting device at a desired location.

In yet another alternative embodiment, the laser sighting device 100 may include a mounting mechanism for a tripod such that the device is mountable on a tripod for horizontal, vertical or any angle of alignment without being attached to a structure, such as a joist. One embodiment for a tripod mounting mechanism 26 is illustrated in FIG. 3 (shown by a dashed line) that would be suitable for attachment to a tripod assembly (not shown). It is contemplated that the tripod mounting mechanism 26 could be attached at other locations on the laser sighting device 100.

Figure 4:
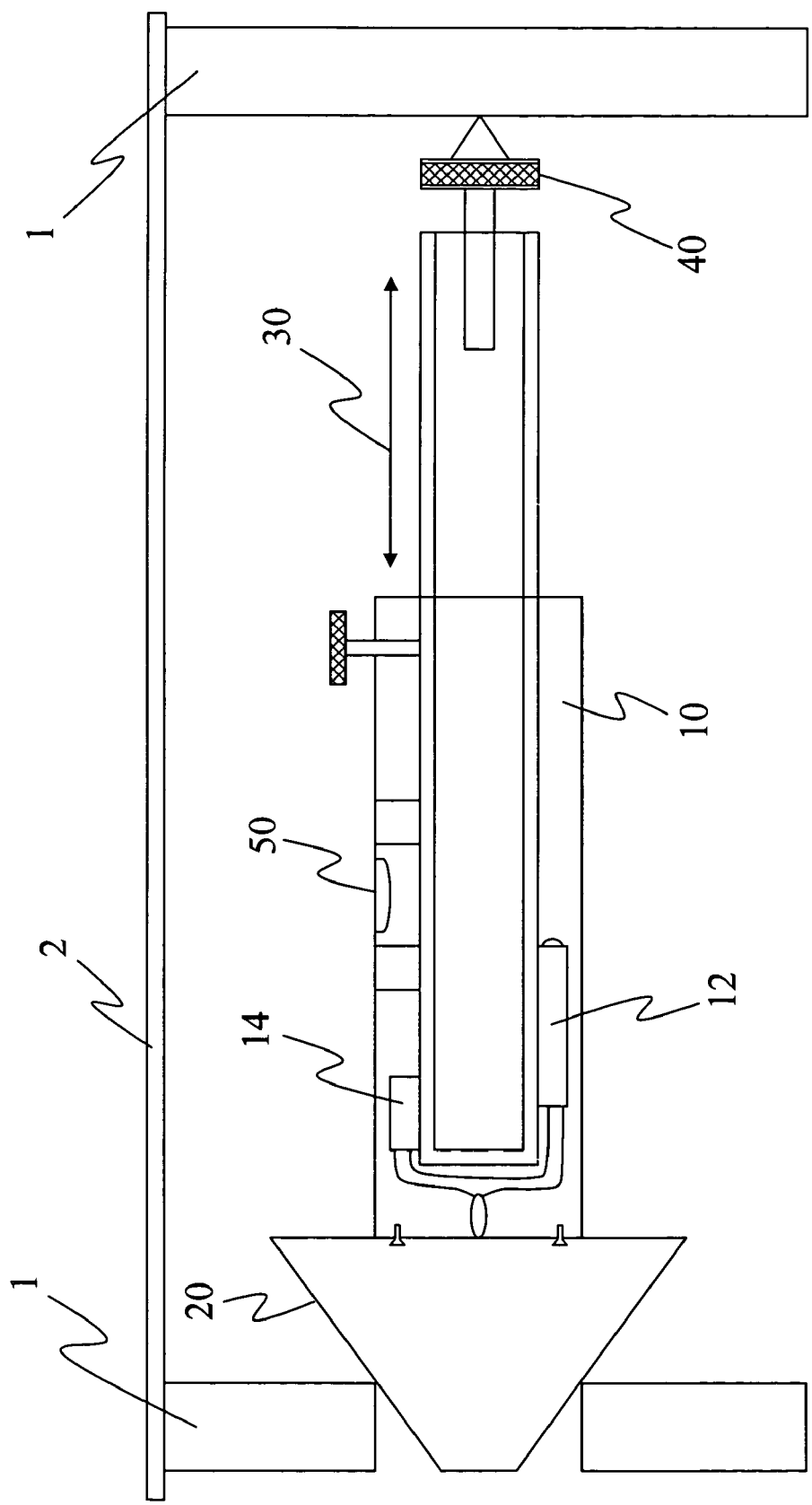
FIG. 4 is a schematic illustration showing the positioning of the laser sighting device in a joist according to one embodiment of the invention.

In another embodiment, the extension tube 30 allows telescopic adjustment in the range of 10" to 20", and preferably 10¼" to 16", and may be locked in place by an extension lock 32. The extension tube 30 may included threaded, spring or ratcheted mechanisms for mounting the laser sighting device 100 between joists, flanges or other parallel structures, as well as non-parallel structures. The adjustable center 40 is flexible to allow secure and accurate positioning of the laser sighting device 100 between adjacent joists or other structures. The adjustable center 40 may be made of materials such as a magnet, rubber of any material that allows the device to be secured to any ferrous or non-ferrous material and may have a shape such as a point, a flat surface or any other shape that allows the device to be secured to a joist or other structure. FIG. 4 illustrates one example of the positioning of the laser sighting device 100 between joists 1.

The main body housing 10 is preferably made of lightweight durable material. Example materials include aluminum tubing or solid aluminum, plastic tubing (rigid), laminated material (i.e. carbon fiber), ferrous metal tubing, and other non-ferrous metal tubing or solid. The housing may be billet machined or injection molded. The housing may be constructed as one integral piece or may be configured as multiple components. The housing may be finished with a material that is protective and durable, including hard coated anodization (for aluminum) or painted by a powder coated or epoxy coated material. Further, in multiple embodiments, the finish on the housing may be a reflective or brightly colored surface for safety and as an aid in locating the device, or a dull surface to aid in hiding the device so that it blends into the background environment. In another embodiment, the housing is designed to contain the laser lighting unit 16, electronics 14, and the power source 12 (e.g. batteries) (See, for example, FIGS. 2 and 4).

At least one end of the housing 10 includes the centering member 20 that provides precise centering of the laser emitted from the laser lighting unit 16. The centering member 20 and interchangeable heads 22 may be made of a durable and lightweight material including aluminum, plastic, laminated material (i.e. carbon fiber), ferrous metal and non-ferrous metal. The centering member 20 may be billet machined, cast with either no secondary machining or minimal secondary machining, injection molded, or stamped. It may be attached to the housing by direct threading, quick disconnect means (such as snap locking mechanism) or may be permanently attached.

In one embodiment, the centering member 20 may be designed as one piece which universally accommodates drilling holes of, for example, ½ to 4". Alternatively, the centering member may be adjustable, and such adjustment may be performed with multiple components, such as the removeable and interchangeable heads 22. For example, one attached head operates with drilling holes of ½ to 2" and another head operates with drilling holes of 2 to 4". Further, the centering member may be fluted and may be finished with a material that is protective and durable, including hard coated anodization (for aluminum) or painted by a power coated or epoxy coated material. In another embodiment, the centering member itself, rather than or in addition to the main body housing, may be designed to contain the laser lighting unit 16, electronics 14, and/or the power source 12, as shown in FIG. 3.

The extension tube 30 for positioning the laser sighting device between joists is preferably made of lightweight durable material. Example materials include aluminum tubing or solid aluminum, plastic tubing (rigid), laminated material (i.e. carbon fiber), ferrous metal tubing, and other non-ferrous metal tubing or solid. The extension tube may be billet machined or injection molded. The extension tube may be constructed as one integral piece or may be configured as multiple components and attachment to the main body may be performed by direct threaded attachment, quick disconnect, or permanent attachment. The extension tube may be finished with a material that is protective and durable, including hard coated anodization (for aluminum) or painted by a powder coated or epoxy coated material.

The adjustable center 40 allows the laser sighting device 100 to be accurately secured between joints. The center may be constructed of durable and rust resistant material, including 300 series stainless steel. The center may be manufactured by billet machining and attached by a direct threaded connection. For purposes of adjustment, the center is attached to the extension tube by a spring loaded assembly or as a solid center type. It is finished with standard machine finishes.

Figure 5A:
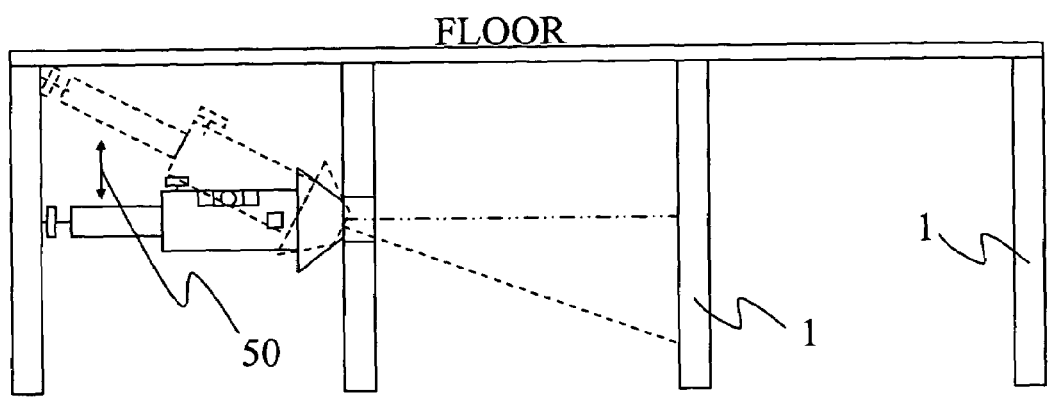
FIGS. 5A and 5B are a side view and top view, respectively, showing adjustment of the laser sighting device between joists according to multiple embodiments and methods of the invention.
Figure 5B:
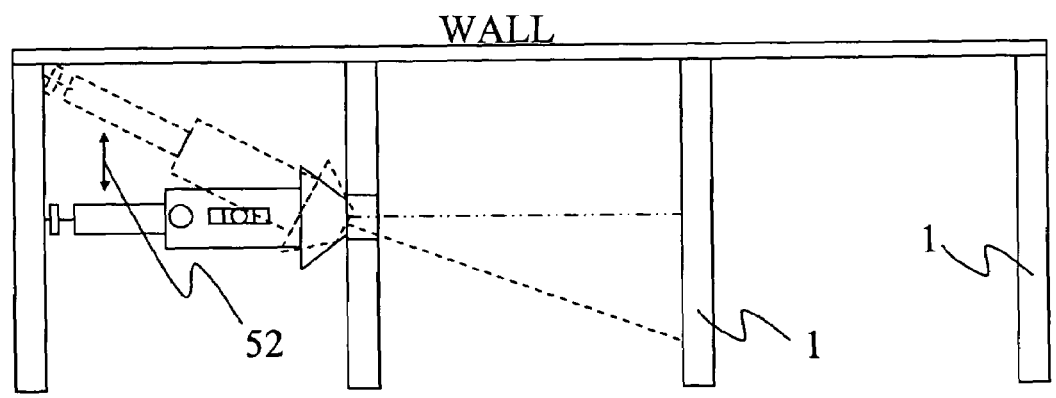

Embodiments of the method of the invention are now described and shown in FIGS. 5A and 5B. A path is located for drilling multiple joist holes having no obstructions between joists. One starter hole is drilled in the first joist. A laser hole finder according to an embodiment of the present invention is installed in the starter hole. The laser hole finder is squared, leveled and pitched as needed for the particular application such that a laser from the laser hole finder is emitted at the desired pitch from the first joist. Slide brackets on the laser hole finder are adjusted to fit the space between joists and fixed in position (for example, using lock nuts). The laser hole finder is activated to emit a laser light through the first joist hole such that a laser light dot is visible on the second joist. A hole is drilled on the second joist, where indicated by the laser light dot. The laser light then shines through to hole in the second joist and a laser light dot is indicated on the third joist showing the third hole drilling position. The same process is repeated to achieve multiple accurately aligned drill holes. As shown in FIGS. 5A and 5B, the positioned orientation of the laser sighting device may include pitch angle adjustments 50 (parallel with the plane of the joists) or yaw angle adjustments 52 (perpendicular to the plane of the joists).

Figure 6A:
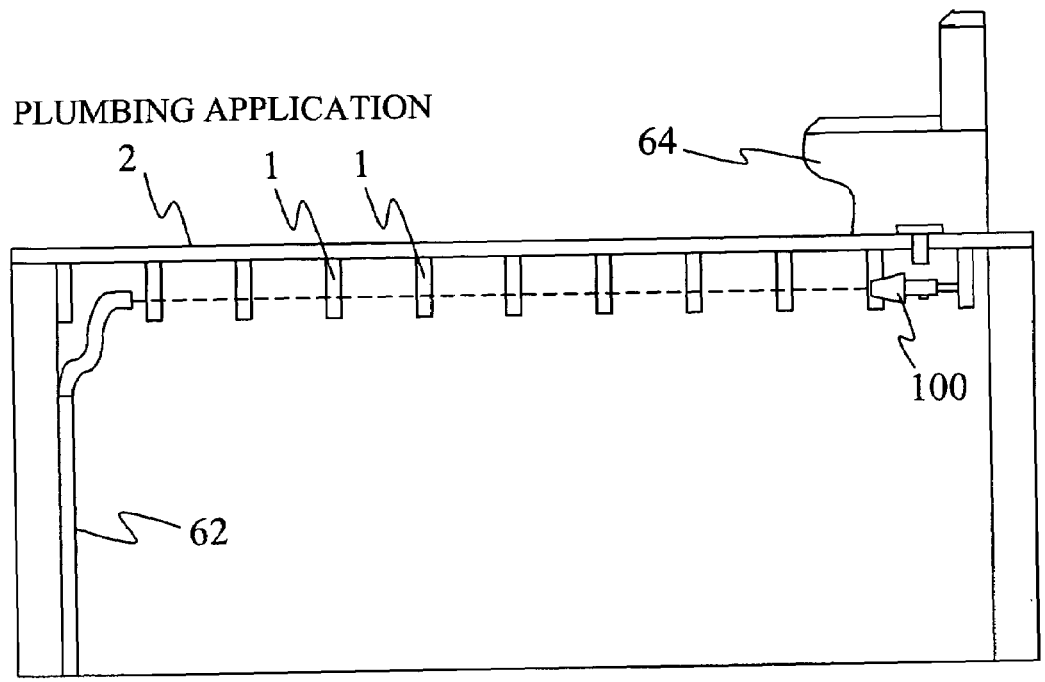
FIGS. 6A and 6B are schematic illustrations showing laser sighting operation in plumbing and electrical applications according to multiple embodiments of the invention.
Figure 6B:
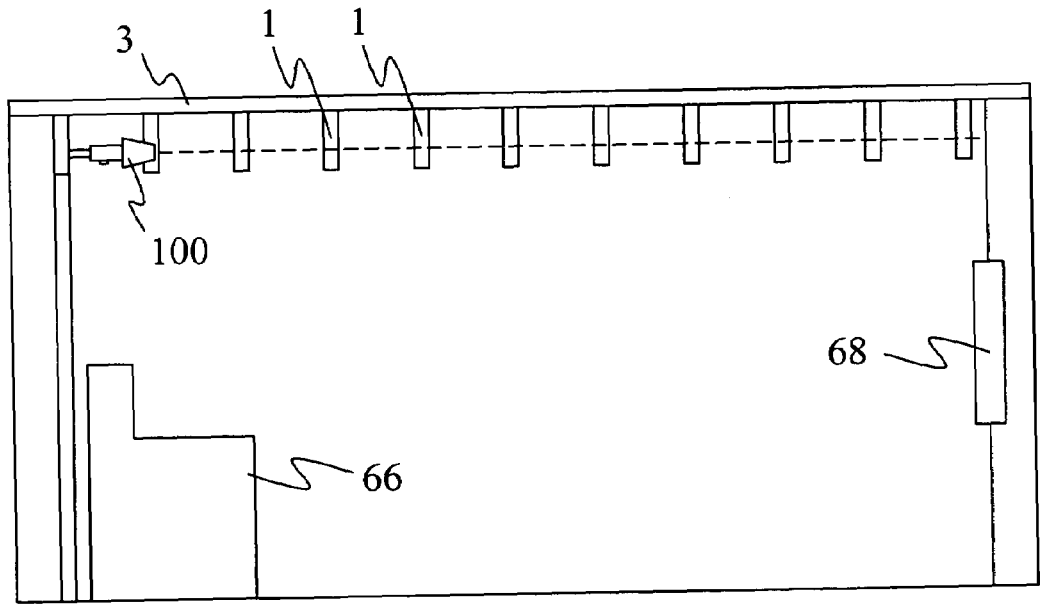

FIGS. 6A and 6B show application of the laser sighting device 100 and method in plumbing and electrical applications. FIG. 6A illustrates the alignment of a stack pipe 62 through joists 1 underneath a floor 2 in connecting plumbing pipes to a plumbing fixture 64 such as a toilet. The laser sighting device 100 is positioned at a desired pitch and yaw underneath the toilet 64 and enables the sequential drilling of multiple in-lines holes needed to install a plumbing pipe that may be pitched as required to correctly connect to the stack pipe 62. A dashed line indicates the desired path of the new pipe that is pitched as required. FIG. 6B illustrates the alignment of wiring in joists 1 in a ceiling 3 in the wiring of an electrical appliance 66 to an electrical panel 68 utilizing the laser sighting device 100. A dashed line indicates the desired path of the installed wiring.

Figure 7:
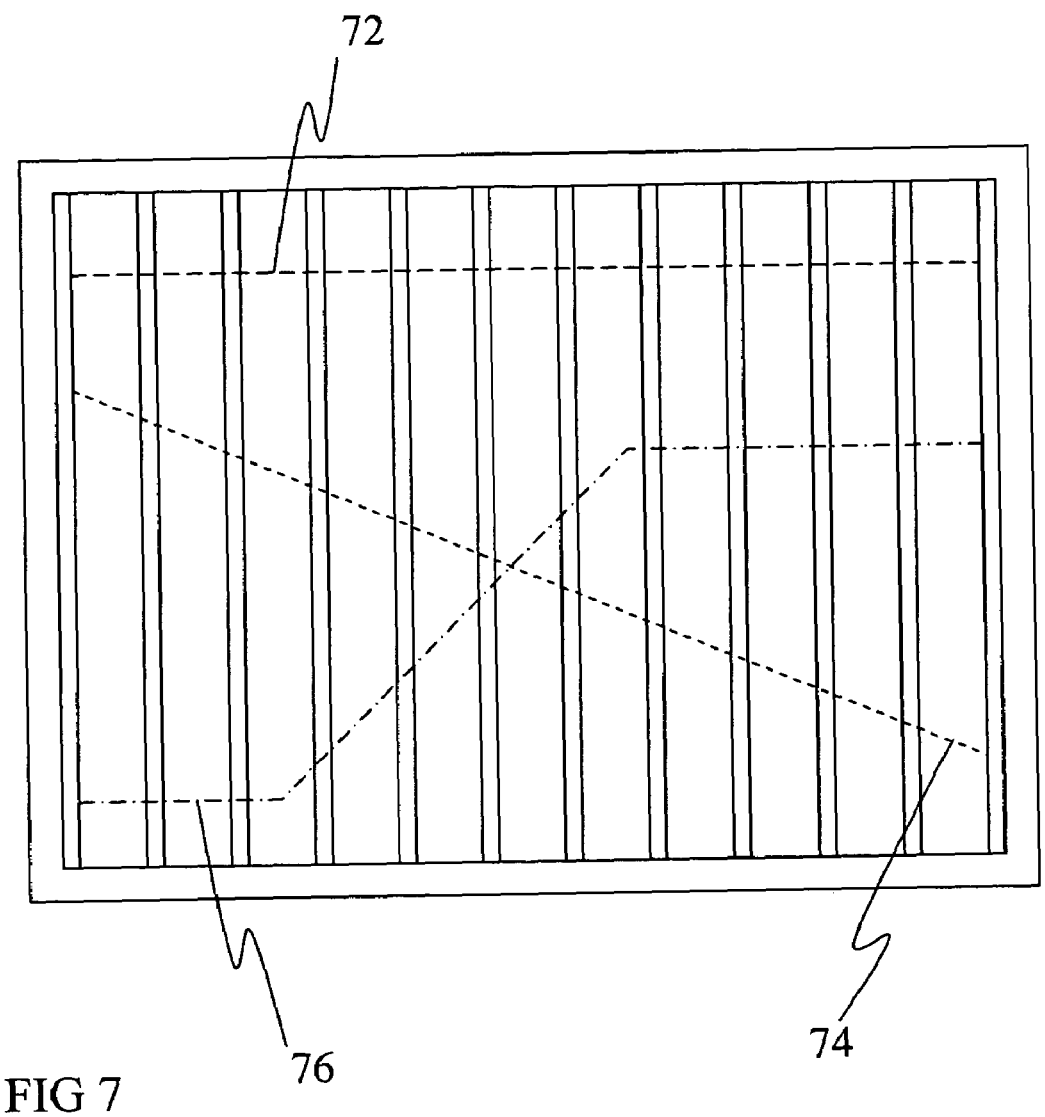
FIG. 7 is a schematic illustration showing multiple laser sighting paths according to multiple embodiments of the invention.

FIG. 7 is a schematic illustration showing multiple sighting paths 70 for laser sighting according to multiple embodiments of the invention. As shown, the path of the laser from the laser sighting device 100 may be perpendicular 72 to the joists 1, at any angle 74 with respect to the joists 1, or formed by an combination of perpendicularity and angularity 76 to the joists 1 (in which the device may be repositioned at the locations of the angle changes or, alternatively, other elements may be used to deflect the laser emitted from the laser sighting device along a new path having a changed angle).

It will be apparent to one of ordinary skill in the art that the device and method of the invention may be utilized to align holes in a wide variety of structures and applications. Besides joists, the present invention may be utilized to align holes with respect to wing ribs, trusses, rafters, pipes, conduits, cable trays, and non-sequential beams, to name a few examples. The present invention may be utilized in the alignment, vertical or otherwise, of building structures such as elevator shafts, stairwells, pipe and duct chases, towers, cranes, prefab panels, walls and other structural components. The present invention may be utilized to align posts for fences and barriers, seating in auditoriums and stadiums, pipes and conduits horizontally, vertically or for any pitch over large distances. Further, the present invention may be utilized on a small scale to align machine components, unit assemblies and sub assemblies horizontally, vertically or for any pitch, yaw and/or cant and especially where tolerances are important.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A device for laser sighting, comprising:
a housing;
a centering member attached to said housing, wherein said centering member includes a centering cone having a conical axis and which is self-centering in a starter hole;
an extension tube attached to said housing;
a laser unit that emits a laser from an end of said centering member in a direction of the conical axis;
at least one measuring device attached to said housing that measures a positioned orientation of said housing; and
at least one adjustment mechanism attached to said housing that secures said housing in said positioned orientation.

2. The device of claim 1, wherein said at least one measuring device measures at least one of pitch angle and yaw angle.

3. The device of claim 1, wherein the at least one measuring device is a spirit level or graduated level.

4. The device of claim 1, wherein said extension tube includes at least one of a threaded mechanism, a spring-loaded mechanism, a ratcheted mechanism, and any combination thereof.

5. The device of claim 1, wherein said at least one adjustment mechanism includes at least one of a flange, a chuck mechanism, a collet, an adjustable center, a mechanism that engages with a tripod assembly, and any combination thereof.

6. The device of claim 1, further comprising a power unit that supplies power to the laser unit.

7. The device of claim 6, wherein said power unit is disposed within said housing.

8. The device of claim 1, wherein said laser unit is disposed within said housing.

9. The device of claim 1, wherein said laser unit is disposed within said centering member.

10. The device of claim 1, further comprising at least one interchangeable head, wherein said interchangeable head engages with and is removable from said centering member.

11. The device of claim 1, wherein said device includes a finished surface that is at least one of a protective surface, a reflective surface, a bright surface, a dull surface, and any combination thereof.

12. The device of claim 1, wherein said extension tube is adjustable and extends to a length sufficient for said laser sighting device to contact adjacent joists and wherein said at least one adjustment mechanism secures said laser sighting device between said adjacent joists at said positioned orientation.

13. A method of hole sighting, comprising:
positioning a laser sighting device at a specific orientation to emit a laser through a first hole in a first structure, wherein said laser sighting device includes a centering cone having a conical axis and which is self-centering in said first hole, and wherein said laser is emitted from an end of said centering cone in a direction of the conical axis;

securing said laser sighting device at said specific orientation;

marking a location for a second hole in a second structure where indicated by said laser emitted through said first hole.

14. The method of claim 13, further comprising using said emitted laser to align said first structure with said second structure.

15. The method of claim 13, further comprising:
drilling said first hole in said first structure; and
drilling said second hole in said second structure where indicated by said laser emitted through said first hole.

16. The method of claim 13, wherein said first and second structures include at least one of joists, ribs, beams, panels, conduits, machine components, support posts, fences, seating, building structures, and any combination thereof.

17. The method of claim 13, further comprising inserting said laser sighting device into said first hole, wherein said laser sighting device is self-centering in said first hole.

18. The method of claim 13, wherein said securing of the laser sighting device includes operation of at least one of a flange, a chuck mechanism, a collet, an adjustable center, a mechanism that engages with a tripod assembly, and any combination thereof.

19. The method of claim 13, further comprising removing a first interchangeable head from said laser sighting device and installing a second interchangeable head on said laser sighting device.

20. A method of laser sighting, comprising:

positioning a laser sighting device at a specific orientation between a first joist and a second joist, wherein said laser sighting device emits a laser through a first hole in said second joist, wherein said laser sighting device includes a centering cone having a conical axis and which is self-centering in said first hole, wherein said laser is emitted from an end of said centering cone in a direction of the conical axis, and wherein said laser sighting device contacts said first joist and said second joist;

securing said laser sighting device at said specific orientation between said first joist and said second joist; and marking a location for a second hole in a third joist where indicated by said laser emitted through said first hole.

* * * * *